United States Patent [19]
Halverson et al.

[11] 3,710,654
[45] Jan. 16, 1973

[54] CABLE STRIPPING TOOL

[75] Inventors: Paul G. Halverson, Concord; Anthony J. Iozzi, Martinez, both of Calif.

[73] Assignee: Thomas & Betts Corporation, Elizabeth, N.J.

[22] Filed: Sept. 4, 1970

[21] Appl. No.: 69,775

[52] U.S. Cl. .................................................81/9.5 R
[51] Int. Cl. .................................................H02g 1/12
[58] Field of Search ................81/9.5 R, 9.51, 9.5 C; 30/90.7, 90.6, 90.1, 90.2

[56] References Cited

UNITED STATES PATENTS 2,446,558  8/1948  Schwartz et al. ...................30/90.7 X
2,789,452  4/1957  Miller ................................81/9.51 X

FOREIGN PATENTS OR APPLICATIONS 1,073,050  1/1960  Germany ............................81/9.51

Primary Examiner—Granville Y. Custer, Jr.
Assistant Examiner—Roscoe V. Parker, Jr.
Attorney—David Teschner and Jesse Woldman

[57] ABSTRACT

A clamping assembly holds a cable that has been inserted in a rotatable cutting assembly in which a spring biased knife having a shoulder to limit the depth of cut is disposed. The blade can be rotated to either of two positions, 90° from each other, so as to effect either a circular or a longitudinal cut on the cable jacket.

8 Claims, 5 Drawing Figures

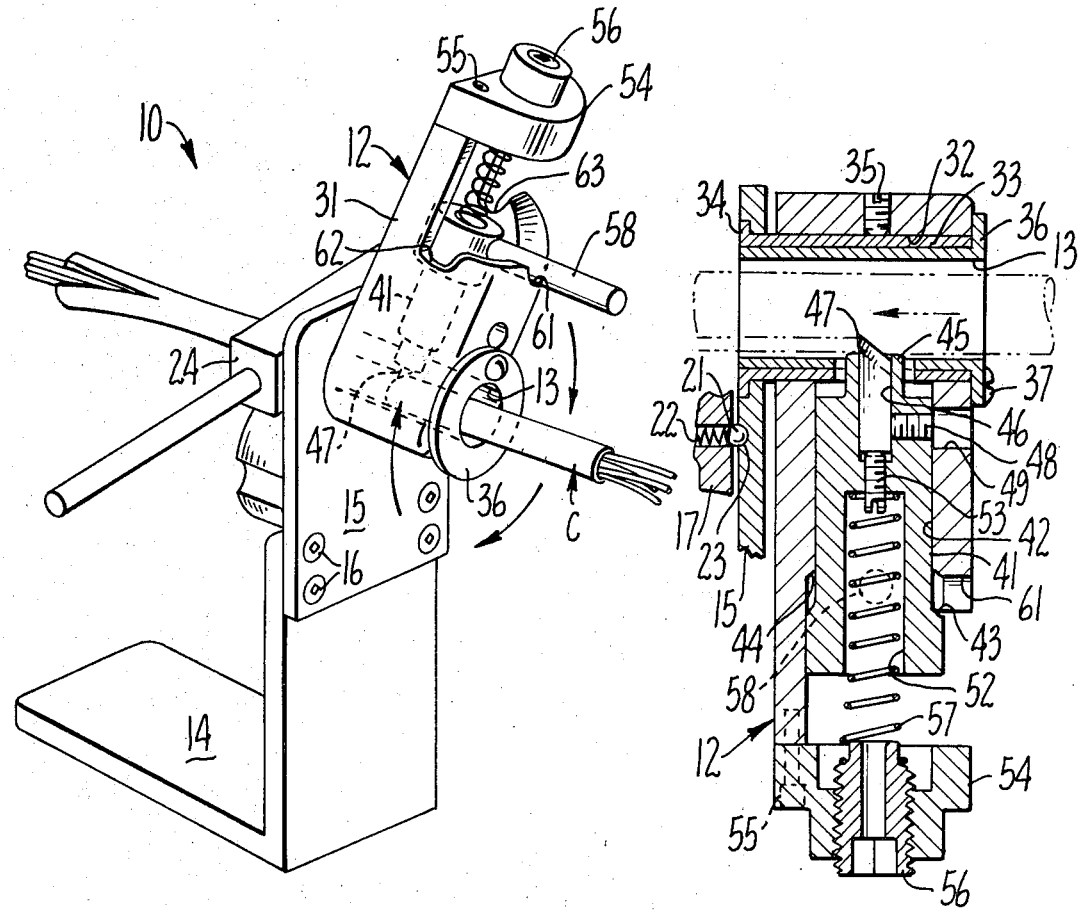
FIG. 1.
FIG. 4.
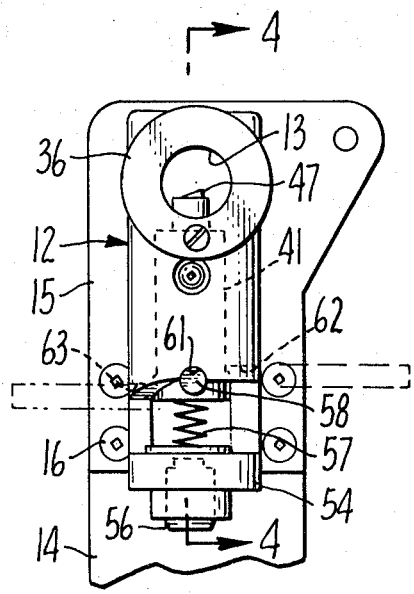
FIG. 2.
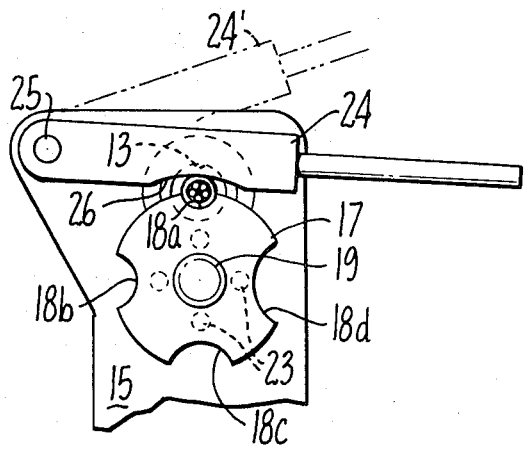
FIG. 3.
INVENTORS
PAUL G. HALVERSON
BY ANTHONY J. IOZZI
Limbach, Limbach & Sutton
ATTORNEYS

PATENTED JAN 16 1973

INVENTORS
PAUL G. HALVERSON
BY ANTHONY J. IOZZI

Limbach, Limbach & Sutton
ATTORNEYS 3,710,654

CABLE STRIPPING TOOL

BACKGROUND OF THE INVENTION

The invention relates to hand operated tools and more particularly to a tool for stripping the outer sheathing from cable, especially cable that is not perfectly cylindrical but out of round due to twists in the conductors within the cable or other non-uniformities.

Prior art patents directed to tools of a similar type include those to Foley (U.S. Pat. No. 1,866,095), Huff (U.S. Pat. No. 2,141,002), Chisena (U.S. Pat. No. 2,830,366), and Stallings (U.S. Pat. No. 3,215,007).

In the Foley, Stallings, and Huff patents, cable stripping tools are disclosed wherein the blade extends beyond a blade-holding assembly an adjustable length depending upon the thickness of the cable sheath to be removed and the blade-holding assembly rides on the surface of the cable so that the blade will only penetrate the sheath the predetermined amount. In Foley and Stallings operator hand pressure biases the blade-holding assembly whereas in Huff the assembly is fixed by a set screw. All of these references also disclose structure which permits circumferential or longitudinal cuts to be made, and in these patents the tool operates independently of any separate clamping structure for holding cable during the cutting operation.

The Chisena patent discloses a stripping tool very much like that of Foley with the addition of rollers to aid in movement of the tool with respect to the cable but without the hand application of pressure to apply the blade-holding assembly against the surface of the cable.

SUMMARY OF THE INVENTION

The device includes a clamping assembly which holds the cable that has been inserted in a cutting assembly. The cutting assembly includes a blade holder slidable inserted in the cutting assembly and spring-biased inwardly toward the cable positioned therewithin. The blade mounted in the blade-holding assembly is exposed beyond the surface of the blade-holding assembly an adjustable distance which is selected to be about three quarters of the thickness of the sheathing for the cable being stripped. The blade-holding assembly is movable between two positions of the blade: 90° with respect to one another; one for cutting the sheathing circularly around the cable and the other for cutting the sheathing longitudinally of the cable.

The device is operated by inserting the cable into the cutting assembly and clamping it with the holding assembly. Then the cutting assembly is rotated at least one revolution so that the knife makes a cut in the sheathing 360° around the cable, but only three quarters of the way through the sheathing. By having the cutting assembly springbiased against the surface of the cable the blade-holding assembly will ride on the surface of the cable sheath regardless of how much the sheath will deviate from a circular pattern. By only extending the knife three quarters of the thickness of the sheath, the sheath is not entirely cut through and cutting of the insulation of the wires within the sheath is avoided. After the three-quarter cut has been performed simply bending the cable back and forth will cause the sheath to part at the cut. The cutting blade can be backed off from cutting position and the cable removed to bend the sheath to complete the separation and slidably remove the separated cylindrical portion of the sheath. In the event a long section of sheathing is being removed from the cable wherein it is difficult to slidably remove the cut cylindrical portion from the cable, the blade-holding assembly is rotated 90° after the circumferential cut has been made so that as the cable is pulled out from the cutting assembly the blade will make a cut three quarters the way through the sheathing longitudinally of the sheathing from the location of the circumferential cut to the end of the sheathing. Thus, the sheathing can be parted along the longitudinal cut for easy removal of the cut sheath.

The cutting assembly can include a chuck type member for accommodation to different cable sizes or a series of differently sized collets corresponding to the dimensions of different sized cable and which can be replaceably inserted in the cutting assembly.

BRIEF DESCRIPTION OF THE DRAWINGS

FIG. 1 is a perspective view of an embodiment of the cable stripping tool according to the present invention showing a circumferential cut being performed on cable.

FIG. 2 is an end view along the aperture axis of an embodiment of the cable stripping tool showing the rotatable cutting assembly in greater detail.

FIG. 3 is a reverse end view from FIG. 2 of an embodiment of the cable stripping tool showing the clamping assembly in greater detail.

FIG. 4 is a cutaway side view along line 4—4 of FIG. 2 showing the interior portion of the cutting assembly and with the blade positioned for a longitudinal cut.

DESCRIPTION OF THE PREFERRED EMBODIMENTS

Figure 5:
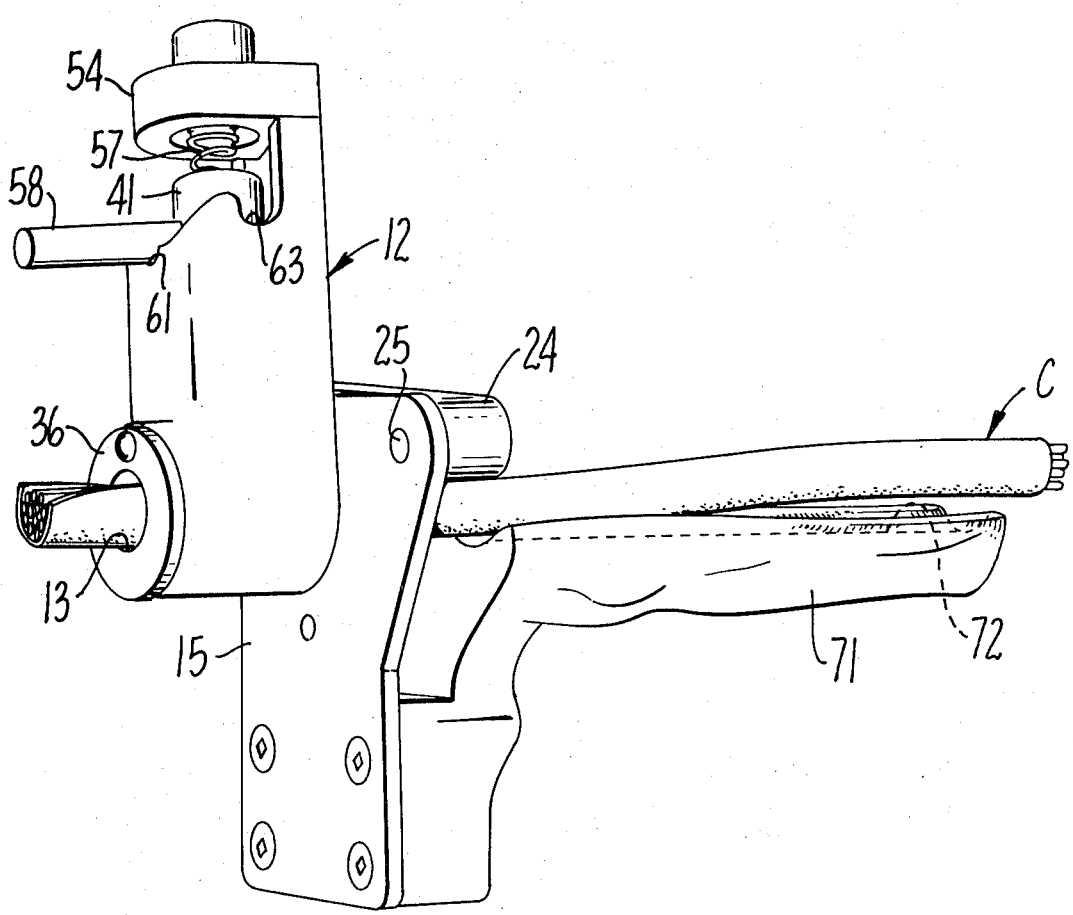
FIG. 5 is a perspective view showing an alternative embodiment of the cable stripping tool according to the present invention.

Referring now to the drawing with particular reference to FIGS. 1 and 4, there is shown a fixed mounting embodiment of the present invention wherein the cable stripping tool 10 includes a fixed support and clamping assembly 11 and a rotatable cutting assembly 12 rotatably mounted on assembly 11 in an aperture 13 (as will be described in greater detail below) for receiving the cable to be cut.

The support and clamping assembly 11 includes an L-shaped mounting bracket 14 which may be secured to a support surface (not shown) in any convenient manner. A mounting plate 15 is attached to the upper end of the bracket 14 such as by screws 16 and includes the aperture 13. A disc 17 having semi-circular depressions 18a–18d of a number of different radii at spaced apart locations about its periphery is rotatably secured to the mounting plate by a bolt 19 such that upon rotation of the disc 17 individual depressions 18a–18d can be aligned with aperture 13. For accomplishing alignment of the depressions with the aperture a ball bearing 21 is spring biased toward plate 15 by a spring 22 and lodges in seats 23 appropriately located to accomplish the desired alignment.

The disc 17 operates in conjunction with a cable clamping lever arm 24 which is rotatably mounted on plate 15 via a bolt 25 parallel to bolt 19. The lever arm 24 includes a concave portion 26 where the lever arm swings past aperture 13 and complementing the largest radius semi-circular portion 18d so that as the lever arm 24 is rotated from a position 24 prime shown in phantom to engage the cable C as shown in FIG. 3, the cable is held securely between the concave surface portion 26 of the arm 24 and the surface of the selected semi-circular depressions 18a–18d of the disc 17.

The rotating cutting assembly 12 is comprised of a generally rectangular parallepiped hollow body 31 having a transverse bore 32 adjacent one end for receiving a flanged bushing 33, the flanged portion 34 of which is located on the same side of plate 15 as disc 17. The bushing 33 extending through aperture 13 rotates therein and projects into the transverse bore 32 of body 31, being held therein by a set screw 35 whereby the body 31 is rotatably supported on plate 15 and receives the cable C to be stripped through the bushing 33.

A flanged collet 36 of selected internal diameter for the cable being operated upon extends into the bushing 33 from the end opposite the bushing flanged portion 34 and is held in place by a screw 37. Collets of size differing from that shown in the drawing can be easily substituted by removal of the screw 37, withdrawal of the collet and replacement with a collet of another size.

A cylindrical blade-holding member 41 is slidably positioned within a cylindrical longitudinal bore 42 in the body 31 intersecting the transverse bore 32. The outside surface of this blade-holding member 41 is provided with a shoulder 43 engaging a corresponding shoulder 44 in the bore 42 for preventing inward movement of member 41 beyond a position that will place the cutting blade at the innermost desired point.

Adjacent the inner end 45 of member 41 the outside surface thereof is reduced in diameter and a blade-holding bore 46 is provided axially of member 41 for holding a blade 47 secured in place by a set screw projecting radially inwardly toward bore 46 and accessible through an aperture 49 in body 31. A larger diameter bore 52 than the bore is provided in the member 41 from the end opposite end 45 and a set screw extends from the end of that bore into bore 46 for setting the amount of cutting blade that extends beyond the inner end 45 of the blade-holding member 41.

Bushing 33 and collet 36 are apertured to permit passage of the end 45 of holding member 41 therethrough into the region where the cable is clamped. A cap member 54 is secured to the outer end of body 31, such as by screws 55, and a set screw 56 is provided in cap member 54 for confining a compression spring 57 within body 31 urging blade-holding member 41 toward its innermost position and the blade 46 into any cable shielding located within the rotating cutting assembly 12.

A handle 57 is provided on the blade-holding member 41 to position it in the different orientations or operation of the device and at the end of the body 31 adjacent to the cap member 54 the body is cutaway to provide three positions for the handle 57, two of which determine the axial or radial orientation of the blade with respect to the cable C and one of which withdraws the member 41 and blade 47 into body 31 through the apertures in the bushings 31 and collet 36 to avoid cutting. As specifically illustrated in FIG. 1, a central slot 61 locates handle 57 such that the blade 47 is aligned perpendicular to the longitudinal axis of the cable whereby rotation of the cutting assembly 12 will move the cutting blade in a plane perpendicular to the axis of the cable to transversely cut the cable sheathing as described in greater detail below. A second slot 62 is provided for the handle rotated about the body 31 90° from slot 61 to align the blade 47 with the longitudinal axis of cable C. The third slot 63 withdraws the blade 47 from cutting position.

As is apparent in FIG. 4 the cutting edge of blade 47 is oriented at an acute angle with respect to the longitudinal axis of the cable for the bushing 33 or collet 36, and the amount of the extension of the blade 47 beyond the end surface 45 of holding member 41 determines the depth of the cut into the cable.

In operation if a cable is to be stripped disc 17 is rotated to place the depression 18a–18d best approximating the cable diameter at the aperture 13. The extension of the blade 47 beyond the end 45 of holding member 41 is adjusted to be about three quarters of the thickness of the cable insulation or jacket. Handle 58 is pulled to bias the holding member 41 against spring 57 and the handle located in knotch 63 whereby the end of the blade is withdrawn from the bore through the collet 36. The lever arm 24 is raised and the cable inserted through collet 36 to the point at which the cut is desired. Next the lever arm 24 is lowered to clamp the cable against disc 17, and handle 58 moved to slot 61 to effect an azimuthal or circumferential cut in the cable insulation. The cutting assembly 12 is then rotated about the cable once or twice whereby the cutting blade scores or cuts the sheathing on the cable. Since the blade holding member 41 is spring biased toward the cable, the end 45 will ride on the surface of the cable even if the cable sheathing is not round. Thus for example in the situation where you have a plastic coated cable as is typically used in many installations today the end 45 of blade holding member 41 will follow the contours of the sheathing so that the blade 47 will cut into the sheathing to a uniformed depth throughout the entire cut. As long as the amount of the blade 47 projecting beyond end 45 is not greater than the thickness of the insulation the blade will not cut into the wire strands inside the cable. In the preferred operation of the present invention the length of blade 47 projecting beyond end 45 is selected to be about three quarters the thickness of the insulation. Thus the blade will never cut through the insulation, but when the cable is removed from the cable stripper assembly a simple bend in the cable will cause the insulation to part at the three quarter depth cut so that the sheathing is then completely severed at the cut. With the sheathing severed it can be slid off the end of the cable as desired.

In those situations where the length of cable sheathing severed from the remaining portion of the cable sheathing is so long as to prevent easy removal of the severed sheathing, the sheathing can be cut longitudinally immediately following the circumferential or azimuthal cut by moving the handle 58 to the slot 62 whereby the blade 47 is aligned in the plane with the axis of the cable. Then as the cable is withdrawn through the collet to remove it from the tool a cut is made longitudinally in the cable and with this cut the cable can be bent to completely sever the sheathing along the longitudinal cut so that the sheathing simply falls off the inner conductors.

Referring now to FIG. 5, an alternative embodiment of the invention is shown being adapted for hand use. As shown there the L-shaped bracket 14 has been omitted and replaced by a hand grip 71 having a concave upper portion 72 for the cable C to lie in. The lever arm 24 has also been eliminated. In operation the cable is inserted in aperture 13 and the operator's hand grips the cable and the hand grip securing the cable to the tool while holding the tool for the cutting operation. In other respects the embodiment of FIG. 5 is identical to that of FIGS. 1-4 and operates in the same manner.

This cable stripping tool thus described provides a fast, versatile device requiring little operator skill so that plastic, rubber, thin metallic or other jackets or sheaths can easily be removed from cables without danger of damaging the wires contained within the cable.

We claim:

1. A cable stripping hand operated tool for making radial and axial cuts in the jacket of a cable comprising: a clamping assembly having an aperture therein; a cutting assembly having an aperture therein; said clamping assembly and said cutting assembly being rotatably joined at said aperture of said clamping assembly and said aperture of said cutting assembly to provide a central aperture through which said cable may be inserted; means for holding said cable stationary relative to said clamping assembly; a knife blade assembly slidably mounted within said cutting assembly substantially perpendicular to said central aperture; said knife blade assembly having a knife blade extendable a predetermined amount beyond a shoulder in the direction of said central aperture; means for providing spring bias compression to urge said knife blade assembly into said aperture; and means for setting said knife blade perpendicular or parallel to the axis of said central aperture and for retracting said knife blade assembly from said central aperture.

2. A cable stripping hand operated tool for making radial and axial cuts in the jacket of a cable comprising: a clamping assembly having an aperture therein; a cutting assembly having an aperture therein; said clamping assembly and said cutting assembly being rotatably joined at said aperture of said clamping assembly and said aperture of said cutting assembly to provide a central aperture through which said cable may be inserted; means for holding said cable stationary relative to said clamping assembly; said means for holding said cable comprising: a rotatable disc having concave portions in its periphery, the radii of said portions being selected to approximate the radii of cables to be cut; said disc located on one side of said central aperture so as to provide a surface on which an inserted cable will rest, and a movable lever arm located on the opposite side of said central aperture for clamping said cable against said disc; a knife blade assembly slidably mounted within said cutting assembly substantially perpendicular to said central aperture; said knife blade assembly having a knife blade extendable a predetermined amount beyond a shoulder in the direction of said central aperture; and means for providing spring bias compression to urge said knife blade assembly into said aperture.

3. A cable stripping hand operated tool for making radial and axial cuts in the jacket of a cable comprising: a clamping assembly having an aperture therein; a cutting assembly having an aperture therein; said clamping assembly and said cutting assembly being rotatably joined at said aperture of said clamping assembly and said aperture of said cutting assembly to provide a central aperture through which said cable may be inserted; means for holding said cable stationary relative to said clamping assembly; said means for holding said cable stationary comprising a grip extending longitudinally from said clamping assembly, said grip having a trough therein for said cable to be in wherein said grip and cable may be grasped by an operator to hold said tool and cable; a knife blade assembly slidably mounted within said cutting assembly substantially perpendicular to said central aperture; said knife blade assembly having a knife blade extendable a predetermined amount beyond a shoulder in the direction of said central aperture and means for providing spring bias compression to urge said knife blade assembly into said aperture.

4. A cable stripping hand operated tool for making radial and axial cuts in the jacket of a cable comprising
   a clamping assembly having an aperture therein,
   a cutting assembly having an aperture therein, said assemblies being rotatably joined at said apertures to provide a central aperture through which said cable may be inserted,
   means for holding said cable stationary relative to said clamping assembly,
   a knife blade assembly slidably mounted within said cutting assembly substantially perpendicular to said central aperture,
   said knife blade assembly having a knife blade extendable a predetermined amount beyond a shoulder in the direction of said central aperture,
   means for providing spring bias compression to urge said knife blade assembly into said aperture,
   means for setting said knife blade perpendicular or parallel to the axis of said central aperture, and
   means for retracting said knife blade assembly from said central aperture, said retracting means including an arm extending from said cutting blade assembly for nesting in first, second and third cut out portions of said cutting assembly.

5. Apparatus according to claim 1 wherein said cutting assembly aperture has dimensions defined by a removable collette.

6. Apparatus according to claim 4 wherein said cutting assembly aperture has dimensions defined by a removable collette.

7. A cable stripping hand operated tool for making radial and axial cuts in the jacket of a cable comprising: a cutting assembly having an aperture therein through which said cable is insertable; a knife blade assembly slidably mounted within said cutting assembly substantially perpendicular to said central aperture; said knife blade extending a predetermined amount beyond a shoulder in the direction of said aperture; means for providing spring bias compression to urge said knife blade assembly into said aperture and means for setting said knife blade perpendicular or parallel to the axis of said aperture and for retracting said knife blade assembly from said aperture.

8. Apparatus according to claim 7 further comprising means for adjusting the extension of said knife blade beyond said shoulder.

* * * * *